July 1, 1941.   W. G. MAXCY   2,247,958
WEEDING TOOL
Filed May 10, 1939
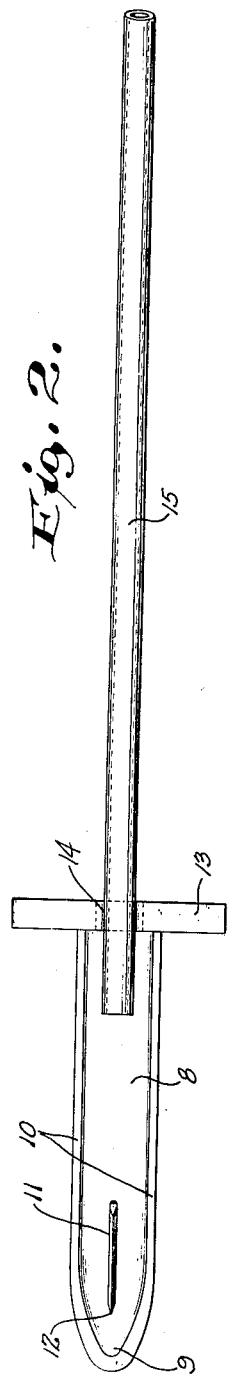
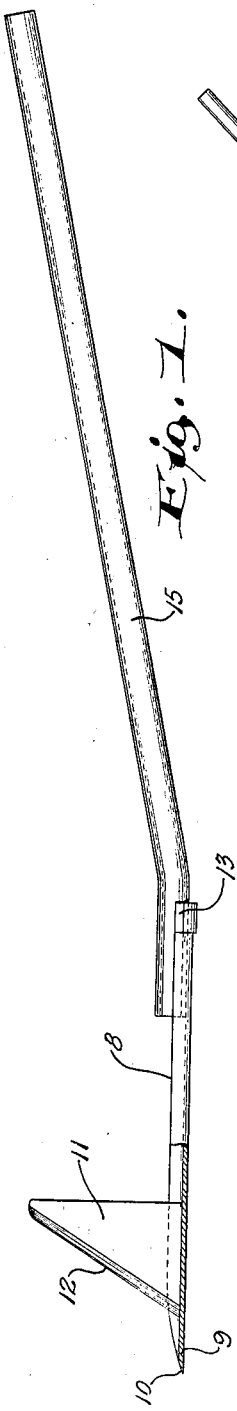
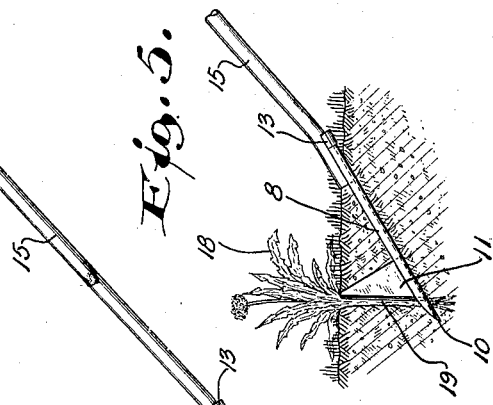
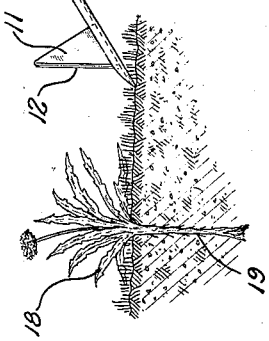
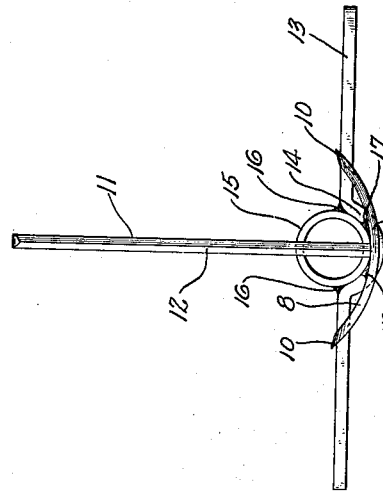
INVENTOR.
BY Warren G. Maxcy,
Morsell, Lieber & Morsell
ATTORNEYS.

Patented July 1, 1941

2,247,958

UNITED STATES PATENT OFFICE 2,247,958

WEEDING TOOL

Warren G. Maxcy, Oshkosh, Wis., assignor to Isabel T. Maxcy, Oshkosh, Wis.

Application May 10, 1939, Serial No. 272,742

1 Claim. (Cl. 294—49)

This invention relates to improvements in the art of weed extermination, and more particularly to an improved tool for use in weed extermination, and to a method of exterminating weeds.

Many forms of weeds, of which the dandelion is a good example, thrive in lawns and grass plots, and by virtue of their hardiness and ability to spread, are apt to impair or ruin the lawn. It is also very difficult to remove or exterminate weeds of this character because of their relatively long and tenacious roots. Heretofore it has been the practice to attempt to remove such weeds or plants by means of tools, but in such cases the tools, either intentionally or inadvertently, are caused to cut or sever the roots of the plants with the result that when the upper cut portion of the plant is removed, a severed portion of its root remains imbedded in the soil and ultimately produces additional plants. According to prior practices any attempt to remove the entire plant with its roots unsevered, would result in an excavation of a size which would kill or spoil a large area of grass and which would require an undue amount of filling and patching.

The present invention aims at overcoming the aforementioned difficulties and objections by the provision of an implement and method whereby all of the roots of the plant being worked on may be readily removed from the soil through a narrow slot in the soil which is thereafter easily tamped over without damage to the lawn or grass.

A further object of the invention is to provide a weed exterminating implement which is adapted to provide a relatively narrow, but deep excavation extending angularly from the top surface of the soil inwardly to the lower portion of a plant root.

A further object of the invention is to provide a weed exterminating implement having a trowel-like excavating portion and a thin cutting member associated perpendicularly with the trowel-like portion whereby the implement will produce in the soil a narrow triangular excavation through which the plant may be bodily removed.

A further object of the invention is to provide a weed exterminating implement which is of very simple construction, is inexpensive to manufacture, and is easy to manipulate.

A further object of the invention is to provide a weed exterminating implement and method which is practical and expeditious in use, which will not damage or unduly dig up a lawn or grass plot, and which is well adapted for the purposes set forth.

With the above and other objects in view, the invention consists of the improved weed exterminating implement and method of exterminating weeds, and its parts and combinations, and steps as set forth in the claim.

In the accompanying drawing in which the same reference characters indicate the same parts in all of the views:

Fig. 1 is a side view of the improved weed exterminating implement with a portion of the trowel or shovel thereof being broken away and in section;

Fig. 2 is a top view of the implement;

Fig. 3 is a front end view of the implement on a larger scale;

Fig. 4 is a sectional view through a grass plot showing the weed therein and the manner in which the implement is applied; and Fig. 5 is a view similar to Fig. 4 only showing the implement after the same has been forced into the soil in the neighborhood of the weed to engage the weed and to provide a removal excavation.

Referring now more particularly to the drawing, it will appear that the improved weed exterminating implement comprises an elongated dished or concave shovel or trowel member 8 having a tapered front end portion 9. The opposite side edges of the shovel or trowel 8, as well as the reduced front end 9 are beveled or sharpened as at 10 to provide cutting edges. Within the dished forward portion of the trowel or shovel 8 there is mounted, medially of the sides of said member, a triangular, thin, cutting member 11. Said member 11 has its lower edge welded or otherwise secured to the top dished surface of the member 8 and is generally perpendicular relative to the member 8, but its forward edge 12 is at an acute angle relative to its lower edge. Said forward edge 12 is furthermore sharpened and beveled as shown for cutting purposes.

At the rear end of the trowel or shovel member 8 there is a transverse bar 13. This bar is downwardly bowed or curved, intermediate its ends, to provide a semi-circular recess or saddle 14, within which a forward end portion of an elongated tubular handle member 15 seats. The portion of the handle which is seated within said saddle 14 is secured therein by spot welding as indicated at 16 in Fig. 3. The rear end portion of the trowel or handle member is held in position against the transverse bar 13 by suitable means, and it is also spot welded to adjacent lower portions of the handle 15, as at 17.

In the use of the improved implement, for weed extermination or removal purposes, and in carrying out the improved method, the forward end of the trowel portion of the implement is first applied angularly to the top surface of the soil at a substantial distance away from the plant designated 18 in the manner shown in Fig. 4. The operator of course engages the handle 15 with his hands, exerting pressure thereon, and can apply a foot to the transverse bar 13 in order to force the trowel portion of the implement into the soil. The implement is forced into the soil downwardly angularly toward the lower portion of the root of the weed until the condition illustrated in Fig. 5 has been attained. Practice will dictate how far the nose of the implement should originally be spaced from the top of the plant, and when the implement is forced downwardly angularly into the soil to its fullest extent, the nose of the trowel portion will cut through a lower end portion of the root 19 of the weed, and the forward cutting edge 19 of the element 11 will be positioned adjacent a vertical extent of the root. It should be noted that the implement, in being forced from the position of Fig. 4 to that of Fig. 5, cuts in the soil a downwardly angularly extending trough formed by the trowel member 8, and at the same time in the top surface of the soil, from the starting point of the implement to the side of the plant, there is cut by the member 11 a narrow slot, which is in communication with the downwardly extending trough. When the implement has been forced to its furthermost position of Fig. 5, it is merely reciprocated slightly arcuately or laterally and is then withdrawn along the same path cut during its insertion. Upon removal of the implement it will be found that a very narrow triangular excavation has been formed. One leg of the excavation extends from the starting point of the implement along the surface of the soil to the plant. Another leg of the excavation extends from the starting point of the implement downwardly, angularly to a lower portion of the plant root, and the third leg of the excavation extends vertically upwardly from the inner end of the second leg to the inner end of the first leg. The user is enabled not only to bodily remove from the soil the main portion of the weed, but he may also enter his fingers into the triangular excavation and remove therethrough any cut or severed lower portions of the root of the plant, whereby the complete plant and all of its root portions are removed from the soil and lawn. The excavation provided has but a limited size entrance and a very narrow slot extending to the point of removal of the weed, and this excavation slot is easily covered over and filled by foot pressure or slight tamping, without damage to the lawn and without the necessity of additional sodding or seeding.

From the foregoing description it will appear that the improved implement and method provide for the complete removal of all portions of a weed from the soil without damage to the lawn area, is simple and expeditious, and is well adapted for the purposes set forth.

What is claimed as the invention is:

A weed removing implement, comprising a dished trowel member having a tapered and sharpened front end portion, a thin cutting plate rigidly mounted on and projecting upwardly from a top central surface portion of said trowel member, the forward edge of said plate being formed as a cutting edge and being rearwardly upwardly inclined, a transverse bar carried by the rear portion of said trowel member, the central portion of said bar being recessed to form a saddle, and an elongated handle having its inner end portion seated and secured within said bar recess, other portions of said bar being adapted to receive foot pressure.

WARREN G. MAXCY.